Patented Aug. 26, 1947

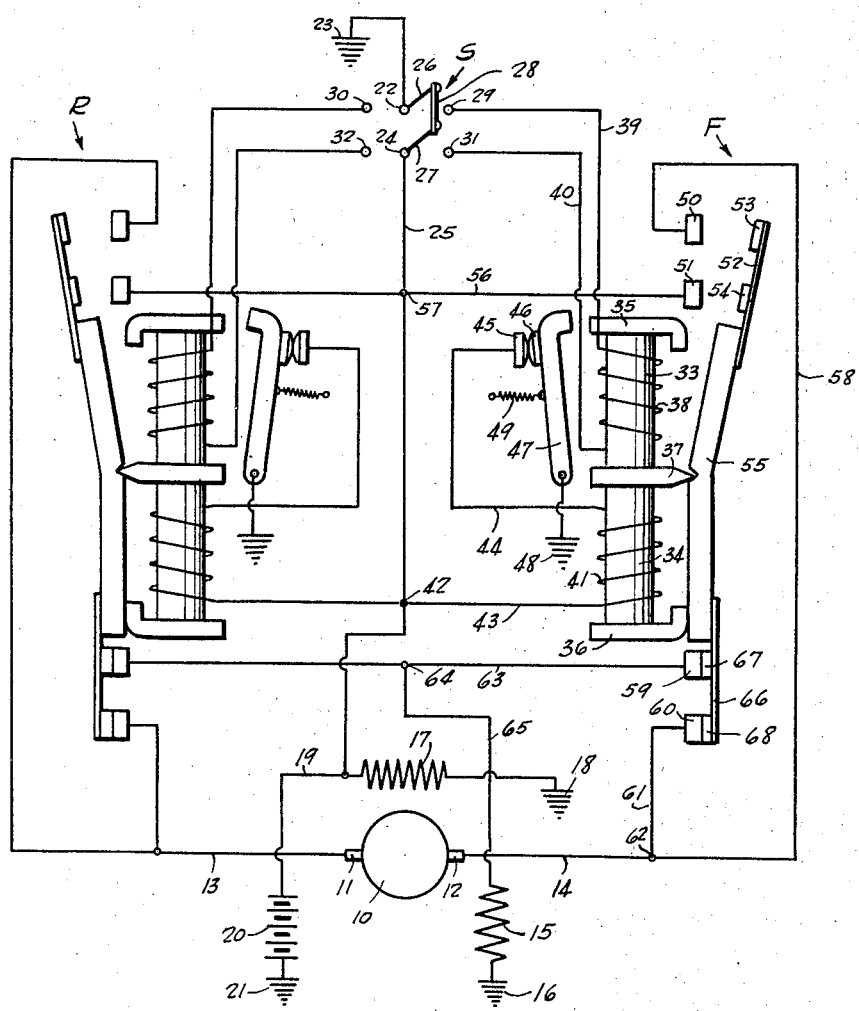

2,426,378

UNITED STATES PATENT OFFICE 2,426,378

COMPOUND MOTOR WITH RELAY FOR REVERSING AND BRAKING

Amos L. Stanley, Middletown, Del., assignor to All American Aviation, Inc., Wilmington, Del., a corporation of Delaware Application July 9, 1945, Serial No. 603,822

4 Claims. (Cl. 172—179)

1

This invention relates to an electric relay and is concerned primarily with the relay designed for use in conjunction with a compound wound motor in which the series field provides dynamic braking effects.

As connoted by its name a compound wound motor includes both a shunt and a series field. By maintaining the series field excited after passage of current through the armature is discontinued, dynamic braking effects are afforded. That is, the series field acts as a brake. In order to maintain this excitation it has been the practice to employ so-called "holding contacts" for controlling the circuit through the series field. Heretofore it has been the practice to employ purely mechanical devices as the means for maintaining these holding contacts in engagement. With these known arrangements every time the motor is turned on or off a serious condition of arcing is created with resulting damage.

Accordingly, the invention has in view as its foremost objective the provision of an electric relay designed for association with a compound wound motor which includes electrical means for maintaining the holding contacts in effective engagement.

In carrying out this idea in a practical embodiment, the invention proposes an electric relay designed to control the operation of a compound wound motor in either of two directions. That is, the motor may be run forwardly or in reverse. In view of this condition a further object is the provision of an electric relay including appropriate devices for giving this forward and reverse operation.

Various other more detailed objects and advantages of the invention such as arise in connection with carrying out the above noted ideas in a practical embodiment will in part become apparent and in part be hereinafter stated as the description of the invention proceeds.

The invention, therefore, comprises an electric relay designed for use with a compound wound motor which includes holding points for the series field of the motor together with electrical means for maintaining the holding points in closed position. Various other electrical devices are included in appropriate circuits to provide for the desired mode of operation.

For a full and more complete understanding of the invention reference may be had to the following description and accompanying drawing, wherein:

The figure is a diagrammatic illustration of an electric relay embodying the precepts of this invention.

Referring now to the drawing wherein like reference characters denote corresponding parts, the armature of a compound wound motor is designated 10. Brushes shown at 11 and 12 complete the circuit through the armature and these brushes are connected to the lines 13 and 14, respectively. A series field is shown at 15 and is grounded on one side as indicated at 16. The ground may consist of the framework of the motor in accordance with well-known practice. A shunt field designated 17 is grounded as indicated at 18 and its opposite end is connected by line 19 with a suitable source of power such as the battery indicated at 20. The latter is in turn grounded as shown at 21.

Inasmuch as the electric relay of this invention is intended to provide for forward and reverse operation of the motor, the component parts of which have been described above, the relay includes two sides which are substantial duplicates. The forward side is referred to in its entirety by the reference character F and the reverse side by the reference character R. The various elements which appear on one side are duplicated in the other. Thus, for the purposes of this specification, certain elements of the relay will be described for only one side but it is to be understood that they will be duplicated in the other side.

A two-way double pole switch is shown at S. It includes a terminal 22 which is connected with the ground as indicated at 23. A second terminal 24 is connected by a line 25 to the line 19 which extends off from the shunt field. The switch S also includes a pair of connecting elements 26 and 27 which may be mechanically joined by a handle shown at 28. The element 26 is adapted to connect the terminal 22 with either the terminal 29 on the forward side or a corresponding terminal 30 on the reverse side while the element 27 is adapted to connect the terminal 24 with either terminal 31 on the forward side or the terminal 22 on the reverse side.

A solenoid core provides two solenoid sections 33 and 34. A pole piece 35 is carried at the end of the section 33 and another pole piece 36 is carried at the end of the section 34. Mid-way between the sections the solenoid core carries a knife 37.

Wound on the section 33 is a coil 38 which has one end connected to the terminal 29 by a line 39 and its other end connected to the terminal 31 by a line 40. A second coil 41 is wound on the section 34 and one end of this coil 41 is connected to the line 25 at 42 by line 43. The other end of the coil 41 is connected by line 44 to a contact 45. Co-operating with the contact 45 is a complemental contact 46 carried by a pivotally mounted switch arm 47 that is grounded at one end as indicated at 48. A spring 49 normally maintains the contacts 45 and 46 in engagement.

A pair of spaced contact points 50 and 51 are adapted to be conductively connected by a finger 52 which carries complemental contact points 53 and 54. The finger 52 is mounted on a rocker arm 55 which is operatively supported on the knife 37. The contact 51 is connected by a line 56 with the line 25 as indicated at 57. The contact 50 is connected by a line 58 with the line 14 extending to the brush 12. Another pair of contact points are shown at 59 and 60. These are the so-called holding points. The point 60 is connected by line 61 with the line 58 at 62 while the point 59 is connected by line 63 to a point of connection 64 which is in turn connected by a line 65 to the series field 15.

The rocker arm 55 also at its opposite end carries a finger 66 which in turn carries contact points 67 and 68 that are complemental to the points 59 and 60, respectively.

The elements above identified as being particularly on the forward side of the relay find their exact counter-parts on the reverse side, it being deemed unnecessary to obscure the drawing and unduly lengthen the specification by repeating a detailed description of these elements.

In describing the operation of the relay it will first be assumed that the switch S is in the opened position illustrated. In this position the spring 49 maintains the contacts 45 and 46 closed and current is supplied to the coil 41 which causes the pole piece 36 to attract the rocker arm 55 and keep the contacts 67 and 68 in engagement with the holding points 59 and 60 to complete the circuit through the series field 15. The armature of the motor will, due to the effects of the excited field, be maintained stationary.

Assume now that the switch S is thrown to the forward position. The first thing that happens is that the circuit to the coil 38 is completed thus energizing this solenoid section. The pole piece 35 now breaks the contacts 45 and 46 and interrupts the circuit to the coil 41. This de-energizes the pole piece 36 and permits the pole piece 35 to attract that end of the rocker arm. Thus, the circuit across the holding points 59 and 60 is broken at the same time the circuit across the contacts 50 and 51 is completed. This completes the circuit through the armature and initiates the operation in the forward direction. When the motor is shut off the apparatus returns to the original condition above illustrated in which the series field is energized to provide the dynamic braking effects.

Upon throwing the switch in the opposite direction the same electrical effects are obtained to drive the motor in the reverse direction.

While a preferred specific embodiment of the invention is hereinbefore set forth, it is to be clearly understood that the invention is not to be limited to the exact construction illustrated and described because various modifications of these details may be provided in putting the invention into practice within the purview of the appended claims.

What is claimed is:

1. In combination a compound motor including a series field, a shunt field and an armature, and an electric relay for controlling operation of said motor, said relay comprising a circuit in which one of said fields is included, holding points in said circuit, means for bridging said holding points to establish electrical communication thereacross, a rocker arm carrying said bridging means, a second circuit controlling the flow of current through said armature, contact points in said second circuit, means for bridging said last mentioned contact points carried by said rocker arm, a pair of solenoids operatively associated with said rocker arm, each of said solenoids including a winding, a control switch in the circuit of one of said windings, and a second switch controlling the circuit of the other winding, and under the influence of the first mentioned solenoid.

2. In combination a compound motor including a series field, a shunt field and an armature, and an electric relay for controlling operation of said motor, said relay comprising a circuit in which said series field is included, holding points in said circuit, means for bridging said holding points to establish electrical communication thereacross, a rocker arm carrying said bridging means, a second circuit controlling the flow of current through said armature, contact points in said second circuit, means for bridging said last mentioned contact points carried by said rocker arm, a pair of solenoids operatively associated with said rocker arm, each of said solenoids including a winding, a control switch in the circuit of one of said windings, and a second switch controlling the circuit of the other winding, and under the influence of the first mentioned solenoid.

3. In combination a compound motor including an armature, a series field and a shunt field, an electric relay for controlling the operation of said motor, said relay comprising electrical circuits for causing the motor to run in a forward direction and a duplicate set of electrical circuits for causing the motor to run in a reverse direction, a main control switch for rendering one of said sets of circuits effective, each of said circuits comprising a circuit in which said series field is included, holding points in said circuits, a bridge for said holding points, a rocker arm carrying said bridge, a second circuit in which said armature is included, contacts in said second circuit, a bridge for said contacts carried by said rocker arm at the end opposite to the end carrying said bridge, a solenoid core divided into a pair of sections, a knife associated with said core and on which said knife said rocker arm is operatively mounted, a pole piece at each end of said solenoid core, a winding on one section of said solenoid core and provided with connections extending to said controlled switch, a second winding on the other solenoid section, said second winding being connected to a circuit including a switch consisting of a pair of contacts, an arm carrying one of said contacts and under the influence of the pole piece on the solenoid section carrying the first winding, and yieldable means normally maintaining said last mentioned contacts in engagement.

4. In combination a compound motor including an armature, a series field and a shunt field, an electric relay for controlling the operation of said motor, said relay including a main control switch and electrical circuits, said circuits comprising a circuit in which said series field is included, holding points in said circuit, a bridge for said holding points, a rocker arm carrying said bridge, a second circuit in which said armature is included, contacts in said second circuit, a bridge for said contacts carried by said rocker arm at the end opposite to the end carrying said bridge, a solenoid core divided into a pair of sections, a knife associated with said core and on which said knife said rocker arm is operatively mounted, a pole piece at each end of said solenoid core, a winding on one section of said solenoid core and provided with connections extending to said controlled switch, a second winding on the other solenoid section, said second winding being connected to a circuit including a switch consisting of a pair of contacts, an arm carrying one of said contacts and under the influence of the pole piece on the solenoid section carrying the first winding, and yieldable means normally maintaining said last mentioned contacts in engagement.

AMOS L. STANLEY.

REFERENCES CITED

The following references are of record in the file of this patent:

UNITED STATES PATENTS

| Number | Name | Date |
|---|---|---|
| 1,124,086 | Wittingham et al. | Jan. 5, 1915 |
| 1,124,189 | Wittingham | Jan. 5, 1915 |